(12) United States Patent
Brown

(10) Patent No.: US 12,119,597 B2
(45) Date of Patent: Oct. 15, 2024

(54) ELECTRICAL JUNCTION BOX ASSEMBLY

(71) Applicant: James Brown, Antioch, TN (US)

(72) Inventor: James Brown, Antioch, TN (US)

( * ) Notice: Subject to any disclaimer, the term of this patent is extended or adjusted under 35 U.S.C. 154(b) by 309 days.

(21) Appl. No.: 17/748,544

(22) Filed: May 19, 2022

(65) Prior Publication Data

US 2023/0378702 A1 Nov. 23, 2023

(51) Int. Cl.
*H02G 3/08* (2006.01)
*H01R 9/24* (2006.01)
*H01R 27/02* (2006.01)

(52) U.S. Cl.
CPC ........... *H01R 27/02* (2013.01); *H01R 9/2458* (2013.01); *H01R 9/2491* (2013.01)

(58) Field of Classification Search
CPC ........... H02G 3/08; H02G 3/081; H02G 3/00; H05K 5/00; H05K 5/02; H05K 5/0217; H05K 5/0247; H01R 27/02; H01R 9/2458; H01R 9/2491; H01R 9/24
USPC ... 174/59, 50, 520, 535, 559, 560, 541, 542, 174/57; 220/3.2–3.9, 4.02; 361/600, 361/601, 622, 641, 728, 730
See application file for complete search history.

(56) References Cited

U.S. PATENT DOCUMENTS

| | | | | |
|---|---|---|---|---|
| 3,564,486 A | * | 2/1971 | Price | H02G 3/16 174/59 |
| 3,848,224 A | * | 11/1974 | Olivero | H02G 3/16 174/59 |
| 4,050,770 A | * | 9/1977 | Rigo | H01R 9/24 439/798 |
| 4,924,032 A | * | 5/1990 | Akins | H02G 3/00 174/53 |
| 6,291,770 B1 | * | 9/2001 | Casperson | B60R 16/0207 174/520 |
| 7,737,360 B2 | * | 6/2010 | Wiemeyer | H04Q 1/13 174/57 |
| 7,841,878 B2 | | 11/2010 | Johnson | |
| 7,968,806 B2 | * | 6/2011 | Shelton | H05K 5/0013 174/67 |
| 8,908,354 B2 | | 12/2014 | Bald | |
| 11,777,444 B2 | * | 10/2023 | Pomerantz | H02G 3/16 174/50 |
| 11,831,099 B2 | * | 11/2023 | Draper | H02G 3/18 |
| 2005/0007780 A1 | | 1/2005 | Feureborn | |
| 2016/0028170 A1 | | 1/2016 | Hyder | |

FOREIGN PATENT DOCUMENTS

EP 0726622 1/1996

* cited by examiner

*Primary Examiner* — Angel R Estrada

(57) ABSTRACT

An electrical junction box assembly includes a junction box that has a power input, a hot terminal block, a ground terminal block and neutral terminal block. A plurality of electrical couplers is each in electrical communication with the hot terminal block and the ground terminal block and the neutral terminal block. A plurality of extension cables is each attachable to a respective one of the electrical couplers such that each of the extension cables is in electrical communication with the power input. Each of the extension cables is electrically coupled to a respective electronic device thereby facilitating the respective electronic device to be in electrical communication with the power input. In this way the extension cables supply the respective electronic device with electrical power without requiring permanent electrical wiring to be installed.

4 Claims, 5 Drawing Sheets

ELECTRICAL JUNCTION BOX ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to junction box devices and more particularly pertains to a new junction box device for installing electrical devices without permanent electrical wiring. The device includes a junction box with a female power input and a plurality of terminal blocks. The device includes a power cord that plugs into the female power input and plurality of electrical couplers that are each wired into the terminal blocks. The device includes a plurality of electrical cables that is each plugged into a respective electrical coupler for supplying electrical power to electronic devices without the use of permanent electrical wiring.

(2) Description of Related Art Including Information Disclosed Under 37 CFR 1.97 and 1.98

The prior art relates to junction box devices including a pre-wired junction box with includes a plurality of buss elements facilitating a quick connect installation of electrical service wiring. The prior art discloses a universal power distribution system that includes a plurality of proprietary sockets and a plurality of proprietary connectors for facilitating a quick connect installation of electrical service wiring. The prior art discloses a modular light assembly which includes a housing, a light emitter integrated into the housing and an electrical connector attached to the housing for engaging an electrical connector on an adjacent housing. The prior art discloses a terminal block assembly for facilitating quick connections of wires to a power source.

BRIEF SUMMARY OF THE INVENTION

An embodiment of the disclosure meets the needs presented above by generally comprising a junction box that has a power input, a hot terminal block, a ground terminal block and neutral terminal block. A plurality of electrical couplers is each in electrical communication with the hot terminal block and the ground terminal block and the neutral terminal block. A plurality of extension cables is each attachable to a respective one of the electrical couplers such that each of the extension cables is in electrical communication with the power input. Each of the extension cables is electrically coupled to a respective electronic device thereby facilitating the respective electronic device to be in electrical communication with the power input. In this way the extension cables supply the respective electronic device with electrical power without requiring permanent electrical wiring to be installed.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
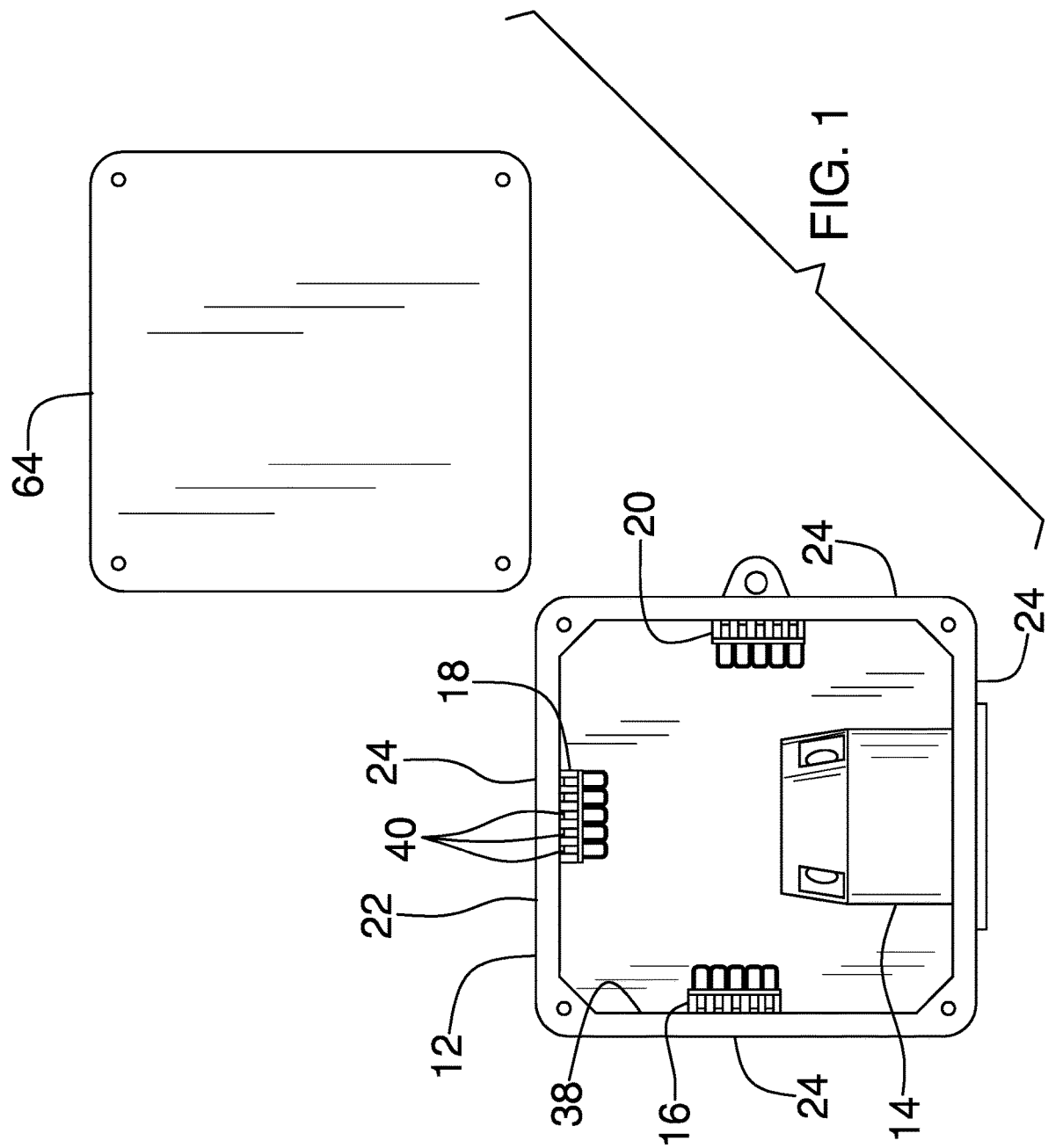
FIG. 1 is a top view of an electrical junction box assembly according to an embodiment of the disclosure.
Figure 2:
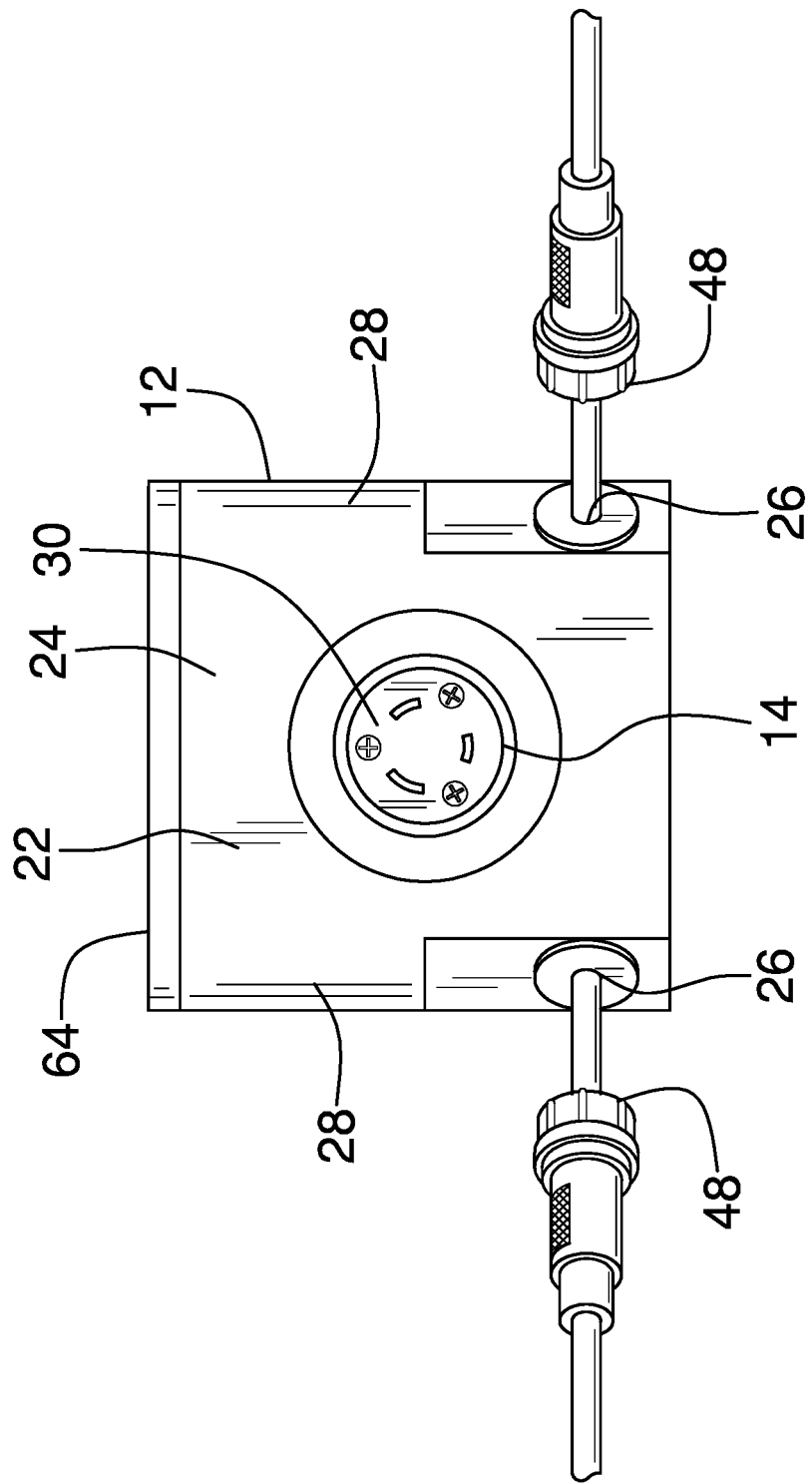
FIG. 2 is a front view of an embodiment of the disclosure.
Figure 3:
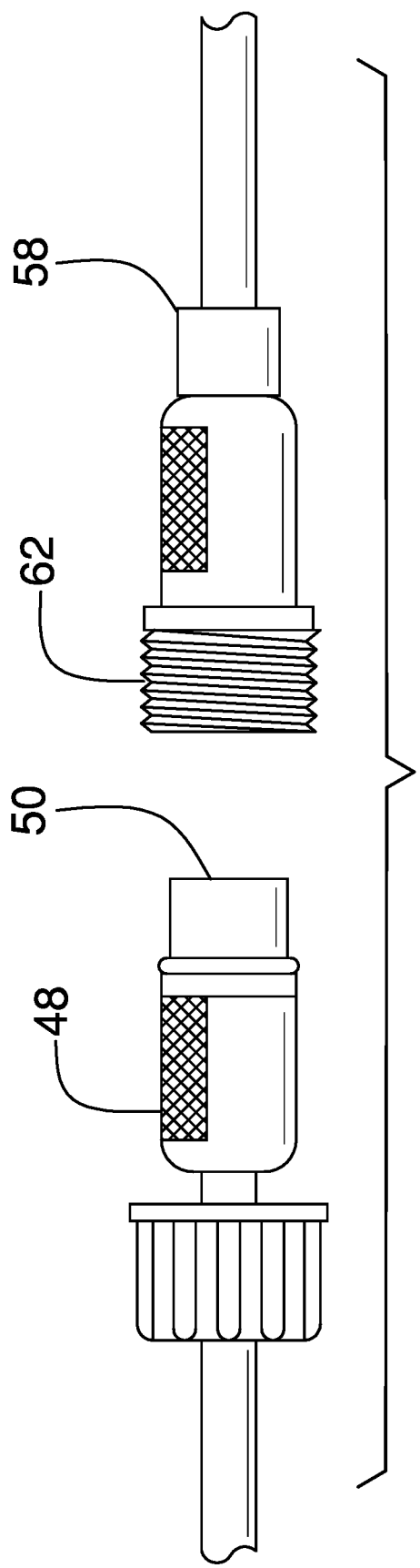
FIG. 3 is an exploded view of an electrical coupler and an extension cable of an embodiment of the disclosure.
Figure 4:
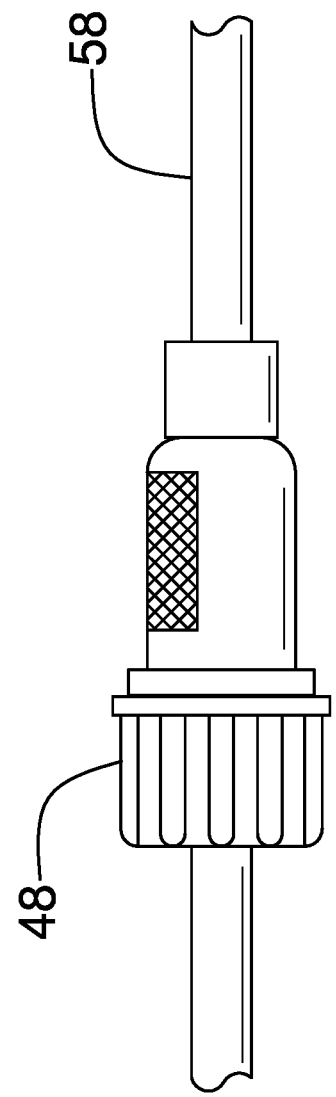
FIG. 4 is a perspective view of an electrical coupler being engaged to an extension cable of an embodiment of the disclosure.
Figure 5:
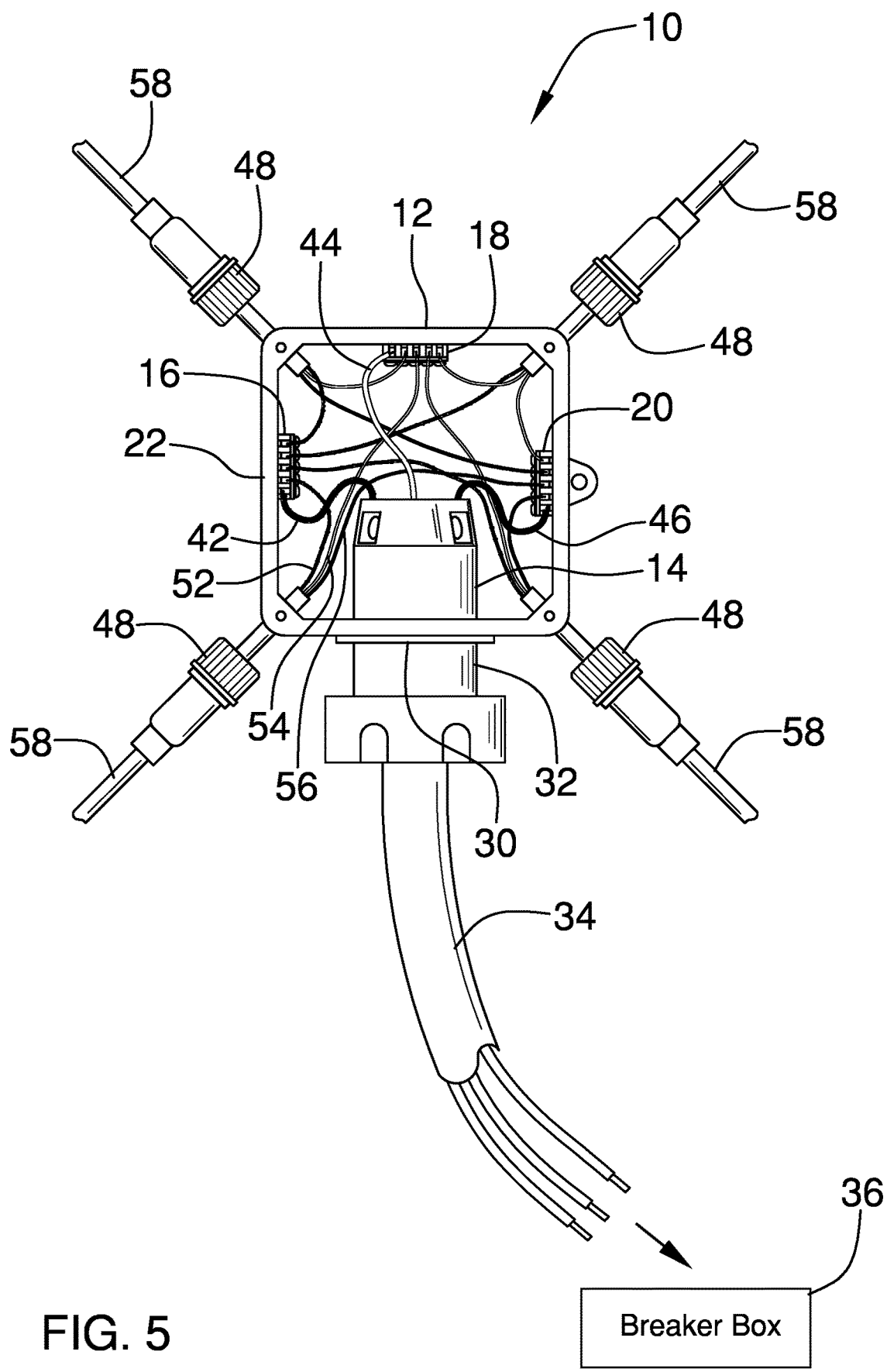
FIG. 5 is a top in-use view of an embodiment of the disclosure.
Figure 6:
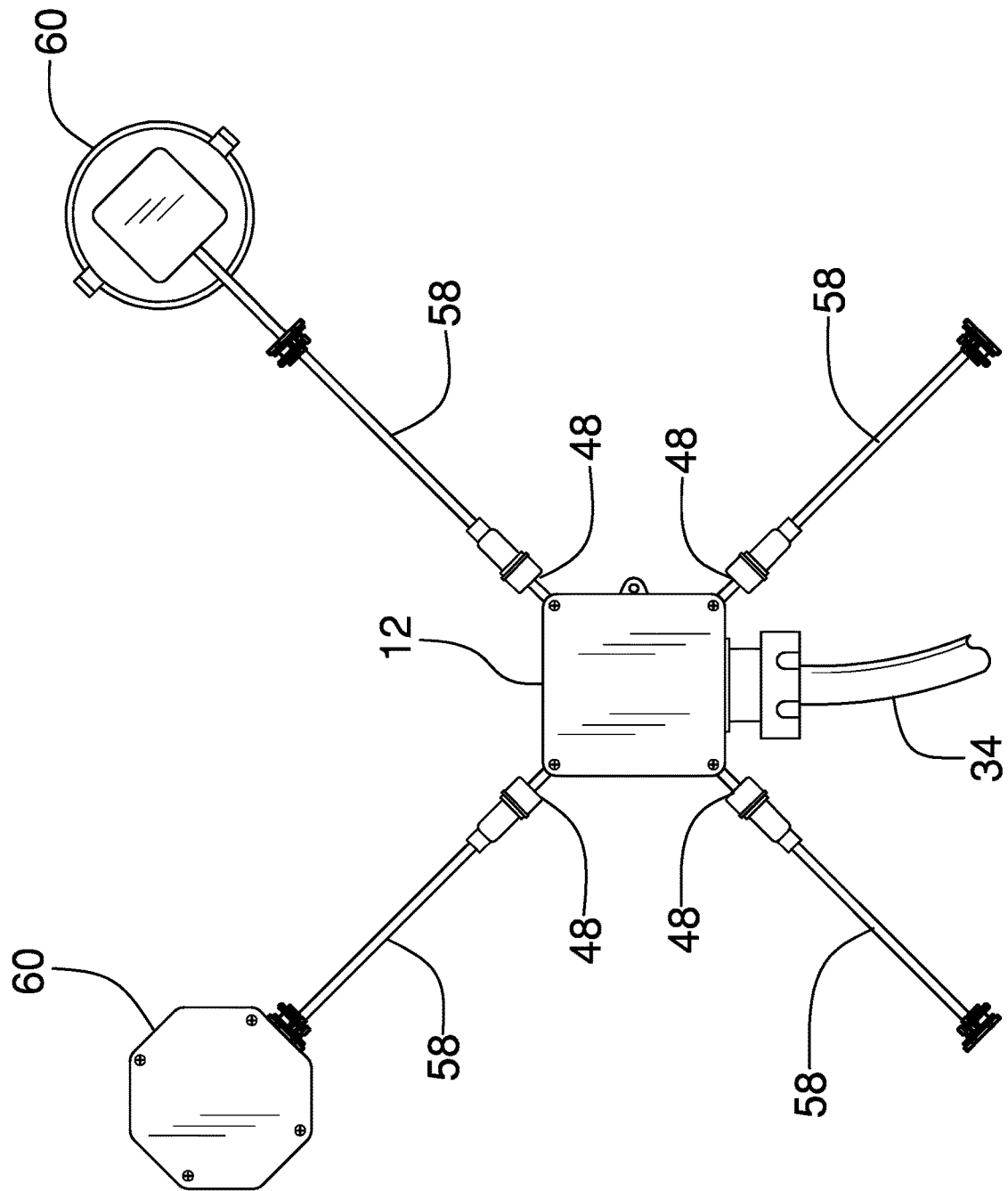
FIG. 6 is a perspective in-use view of an embodiment of the disclosure.

With reference now to the drawings, and in particular to FIGS. 1 through 6 thereof, a new junction box device embodying the principles and concepts of an embodiment of the disclosure and generally designated by the reference numeral 10 will be described.

As best illustrated in FIGS. 1 through 6, the electrical junction box assembly 10 generally comprises a junction box 12 that has a power input 14, a hot terminal block 16, a ground terminal block 18 and a neutral terminal block 20. The power input 14 is in electrical communication with each of the hot terminal block 16 and the ground terminal block 18 and the neutral terminal block 20. The junction box 12 has an outer wall 22 and the outer wall 22 has a plurality of intersecting sides 24 such that the junction box 12 has a rectangular shape. Furthermore, the junction box 12 may be comprised of an electrically insulating material such as plastic or the like and the junction box 12 may be installed in an attic of a house, for example, or other type of occupancy.

The junction box 12 has a plurality of holes 26 each extending through the outer wall 22 and each of the holes 26 is aligned with a respective one of four corners 28 of the outer wall 22. The power input 14 comprises a female electrical socket 30 that is integrated into a respective one of the intersecting sides 24 of the outer wall 22. Furthermore, the female electrical socket 30 can electrically engage a male power plug 32 of a power cord 34. The female electrical socket 30 may comprise a three blade 220.0 volt socket and the power cord 34 may be wired into a breaker box 36 of an electrical system of the occupancy in which the junction box 12 is positioned.

Each of the hot terminal block 16 and the ground terminal block 18 and the neutral terminal block 20 is positioned on an inside surface 38 of a respective one of the intersecting sides 24 of the outer wall 22. Additionally, each of the hot terminal block 16 and the ground terminal block 18 and the neutral terminal block 20 has a plurality of output ports 40. The power input 14 includes a hot conductor 42 that is electrically coupled between the power input 14 and the hot terminal block 16. The power input 14 includes a ground conductor 44 that is electrically coupled between the power input 14 and the ground terminal block 18. Continuing, the power input 14 includes a neutral conductor 46 is electrically coupled between the power input 14 and the neutral terminal block 20.

A plurality of electrical couplers 48 is provided and each of the electrical couplers 48 extends outwardly from the junction box 12. Each of the electrical couplers 48 is in electrical communication with the hot terminal block 16 and the ground terminal block 18 and the neutral terminal block 20. Additionally, each of the electrical couplers 48 includes a female socket 50, a hot conductor 52, a ground conductor 54 and a neutral conductor 56, and the female socket 50 of each of the electrical conductors is exposed with respect to the junction box 12. The hot conductor 52 of each of the electrical couplers 48 is electrically coupled to a respective one of the output ports 40 of the hot terminal block 16. The ground conductor 54 of each of the electrical couplers 48 is electrically coupled to a respective one of the output ports 40 on the ground terminal block 18. The neutral conductor 56 of each of the electrical couplers 48 is electrically coupled to a respective one of the output ports 40 on the neutral terminal block 20. Additionally, the female socket 50 may comprise a threaded circular electrical connector or the like.

A plurality of extension cables 58 is provided and each of the extension cables 58 is attachable to a respective one of the electrical couplers 48 such that each of the extension cables 58 is in electrical communication with the power input 14. Each of the extension cables 58 is electrically coupled to a respective electronic device 60 thereby facilitating the respective electronic device 60 to be in electrical communication with the power input 14. In this way the extension cables 58 supply the respective electronic device 60 with electrical power without requiring permanent electrical wiring to be installed. The electronic device 60 may be a recessed light fixture or other type of electrical fixture that is installed after the occupancy has been constructed. Each of the extension cables 58 has an electrical plug 62 and the electrical plug 62 on each of the extension cables 58 is electrically matable to the female socket 50 of a respective one of the electrical couplers 48. The electrical plug 62 may comprise a threaded circular electrical connector or the like.

In use, the junction box 12 is put into place, in an attic for example, the power cord 34 is wired into the breaker box 36 and the power cord 34 is routed to the junction box 12. The power cord 34 is plugged into the power input 14 and a required number of extension cables 58 are wired into the respective electronic devices 60. Each of the extension cables 58 is routed to the junction box 12 and the electrical plug 62 on each extension cable 58 is plugged into the female socket 50 of a respective electrical coupler 48. In this way each of the electronic devices 60 can be powered by the electrical system of the occupancy without requiring the installation of permanent electrical wiring. As is most clearly shown in FIG. 1, a lid 64 is provided that can be attached to the junction box 12 for closing the junction box 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded.

A reference to an element by the indefinite article "a" does not exclude the possibility that more than one of the element is present, unless the context clearly requires that there be only one of the elements.

I claim:

1. An electrical junction box assembly for facilitating a variety of electrical devices to be wired from a single junction box, said assembly comprising:

a junction box having a power input, a hot terminal block, a ground terminal block and neutral terminal block, said power input being in electrical communication with each of said hot terminal block and said ground terminal block and said neutral terminal block;

a plurality of electrical couplers, each of said electrical couplers extending outwardly from said junction box, each of said electrical couplers being in electrical communication with said hot terminal block and said ground terminal block and said neutral terminal block;

a plurality of extension cables, each of said extension cables being attachable to a respective one of said electrical couplers such that each of said extension cables is in electrical communication with said power input, each of said extension cables being electrically coupled to a respective electronic device thereby facilitating the respective electronic device to be in electrical communication with said power input wherein said extension cables are configured to supply the respective electronic device with electrical power without requiring permanent electrical wiring to be installed;

wherein said junction box has an outer wall, said outer wall having a plurality of intersecting sides such that said junction box has a rectangular shape, said junction box having a plurality of holes each extending through said outer wall, each of said holes being aligned with a respective one of four corners of said outer wall;

wherein said power input comprises a female electrical socket being integrated into a respective one of said intersecting sides of said outer wall wherein said female electrical socket is configured to electrically engage a male power plug of a power cord;

wherein each of said hot terminal block and said ground terminal block and said neutral terminal block is positioned on an inside surface of a respective one of said intersecting sides of said outer wall, each of said hot terminal block and said ground terminal block and said neutral terminal block having a plurality of output ports;

wherein said power input includes a hot conductor being electrically coupled between said power input and said hot terminal block;

wherein said power input includes a ground conductor being electrically coupled between said power input and said ground terminal block; and wherein said power input includes a neutral conductor being electrically coupled between said power input and said neutral terminal block.

2. The assembly according to claim 1, wherein:

each of said electrical couplers includes a female socket, a hot conductor, a ground conductor and a neutral conductor;

said female socket of each of said electrical conductors is exposed with respect to said junction box;

said hot conductor of each of said electrical couplers is electrically coupled to a respective one of said output ports of said hot terminal block;

said ground conductor of each of said electrical couplers is electrically coupled to a respective one of said output ports on said ground terminal block; and said neutral conductor of each of said electrical couplers is electrically coupled to a respective one of said output ports on said neutral terminal block.

3. An electrical junction box assembly for facilitating a variety of electrical devices to be wired from a single junction box, said assembly comprising:

a junction box having a power input, a hot terminal block, a ground terminal block and neutral terminal block, said power input being in electrical communication with each of said hot terminal block and said ground terminal block and said neutral terminal block;

a plurality of electrical couplers, each of said electrical couplers extending outwardly from said junction box, each of said electrical couplers being in electrical communication with said hot terminal block and said ground terminal block and said neutral terminal block;

a plurality of extension cables, each of said extension cables being attachable to a respective one of said electrical couplers such that each of said extension cables is in electrical communication with said power input, each of said extension cables being electrically coupled to a respective electronic device thereby facilitating the respective electronic device to be in electrical communication with said power input wherein said extension cables are configured to supply the respective electronic device with electrical power without requiring permanent electrical wiring to be installed;

wherein each of said electrical couplers includes a female socket that is positioned outside of said junction box; and wherein each of said extension cables has an electrical plug, said electrical plug on each of said extension cables being electrically matable to said female socket of a respective one of said electrical couplers.

4. An electrical junction box assembly for facilitating a variety of electrical devices to be wired from a single junction box, said assembly comprising:

a junction box having a power input, a hot terminal block, a ground terminal block and neutral terminal block, said power input being in electrical communication with each of said hot terminal block and said ground terminal block and said neutral terminal block, said junction box having an outer wall, said outer wall having a plurality of intersecting sides such that said junction box has a rectangular shape, said junction box having a plurality of holes each extending through said outer wall, each of said holes being aligned with a respective one of four corners of said outer wall, said power input comprising a female electrical socket being integrated into a respective one of said intersecting sides of said outer wall wherein said female electrical socket is configured to electrically engage a male power plug of a power cord, each of said hot terminal block and said ground terminal block and said neutral terminal block being positioned on an inside surface of a respective one of said intersecting sides of said outer wall, each of said hot terminal block and said ground terminal block and said neutral terminal block having a plurality of output ports, said power input including a hot conductor being electrically coupled between said power input and said hot terminal block, said power input including a ground conductor being electrically coupled between said power input and said ground terminal block, said power input including a neutral conductor being electrically coupled between said power input and said neutral terminal block;

a plurality of electrical couplers, each of said electrical couplers extending outwardly from said junction box, each of said electrical couplers being in electrical communication with said hot terminal block and said ground terminal block and said neutral terminal block, each of said electrical couplers including a female socket, a hot conductor, a ground conductor and a neutral conductor, said female socket of each of said electrical conductors being exposed with respect to said junction box, said hot conductor of each of said electrical couplers being electrically coupled to a respective one of said output ports of said hot terminal block, said ground conductor of each of said electrical couplers being electrically coupled to a respective one of said output ports on said ground terminal block, said neutral conductor of each of said electrical couplers being electrically coupled to a respective one of said output ports on said neutral terminal block; and a plurality of extension cables, each of said extension cables being attachable to a respective one of said electrical couplers such that each of said extension cables is in electrical communication with said power input, each of said extension cables being electrically coupled to a respective electronic device thereby facilitating the respective electronic device to be in electrical communication with said power input wherein said extension cables are configured to supply the respective electronic device with electrical power without requiring permanent electrical wiring to be installed, each of said extension cables having an electrical plug, said electrical plug on each of said extension cables being electrically matable to said female socket of a respective one of said electrical couplers.

\* \* \* \* \*